United States Patent [19]

Hiramatsu et al.

[11] Patent Number: 4,901,214

[45] Date of Patent: Feb. 13, 1990

[54] CONTINUITY ANGLE CONTROLLED SELF-EXCITED INVERTER CIRCUIT

[75] Inventors: Rihei Hiramatsu, Tokyo; Shigeo Watanabe, Inagi; Yasuyuki Okumura, Inagi; Jun Maruyama, Inagi, all of Japan

[73] Assignee: Yutaka Electric Mfg. Co., Ltd., Japan

[21] Appl. No.: 288,792

[22] Filed: Nov. 18, 1988

[30] Foreign Application Priority Data

Nov. 19, 1987 [JP] Japan ................. 62-292916

[51] Int. Cl.[4] ..................................... H02M 3/335
[52] U.S. Cl. ..................................... 363/19; 363/56; 363/97
[58] Field of Search .................. 363/18–76, 363/56, 95, 97, 131–134, 89, 90, 91

[56] References Cited

U.S. PATENT DOCUMENTS

| 4,021,717 | 5/1977 | Furuishi et al. ........... | 363/19 |
| 4,164,014 | 8/1979 | Crowe et al. ............. | 363/49 |
| 4,378,586 | 3/1983 | Bete ....................... | 363/19 |
| 4,443,838 | 4/1984 | Yamada .................... | 363/19 |
| 4,763,236 | 8/1988 | Usui ....................... | 363/19 |

FOREIGN PATENT DOCUMENTS

0117708 10/1978 Japan ..................... 363/19

*Primary Examiner*—Peter S. Wong
*Attorney, Agent, or Firm*—Lowe, Price, Leblanc, Becker & Shur

[57] ABSTRACT

A self-excited inverter circuit primarily includes a main transformer two switching elements e.g. the first and second (FET) switching elements, wherein capacitors at both ends of said first FET are charged during a time $T_1-T_2$ when said first FET is turned off, and the voltage $V_{g1}$ across said first FET is clamped by a charge voltage $V_{c1}$ and then, a voltage $V_{gs}$ is applied across the gate and the source of said second FET for electrical continuity to cause the voltage to be clamped. The clamped state is maintained from $T_1$ to $T_2$, the saturation reactor is saturated at time $T_3$, and $V_{gs}$, which has been negative, starts to change toward O, thereby causing the first FET to change to ON; $V_q$ falls towards VPi at TP3 and further towards zero point. Thus, the voltage $V_{q2}$ changes to zero to cause $V_{gs}$ of the second FET to become zero and the second FET to be shut off. When said voltage $V_{q2}$ is clamped to a fixed value, a high $-V_{sc}(L)$ can be obtained in the case of Vi(L), whereas a low $-V_{sc}$ can be obtained in the case of Vi(H); and the continuity angle, or duty cycle, $(T_1-T_2)/(T_1-T_3)$ of the first FET is naturally controlled to be kept in a desirable direction.

6 Claims, 6 Drawing Sheets

FIG 8.
In case of Vi(L)

FIG 9.
In case of Vi(H)

FIG. 13 (PRIOR ART)
In case of Vi(H)

FIG. 12 (PRIOR ART)
In case of Vi(L)

CONTINUITY ANGLE CONTROLLED SELF-EXCITED INVERTER CIRCUIT

BACKGROUND OF THE INVENTION

The present invention relates to a continuity angle controlled self-excited inverter circuit for use in a high-frequency switching power source requiring a high reliability.

Figure 10:
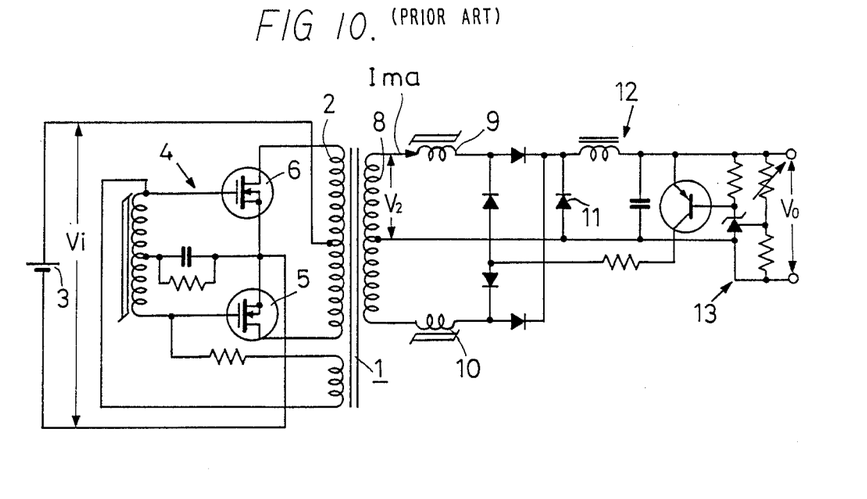
FIG. 10 is a conventional circuit diagram.

Concerning the switching power source to control a self-excited inverter circuit and its output with a magnetic amplifier, one like that shown in FIG. 10 is commonly known. Such a switching power source circuit comprises a self-excited inverter circuit consisting of a main transformer 1, alternate, switching elements 5 and 6 and a saturation reactor unnumbered and a DC circuit 3, which are connected to the primary winding 2 of the main transformer 1, and magnetic amplifiers 9 and 10, a commutator 11, a smoothing filter circuit 12 and a error detection amplifier circuit 13 which are connected to the secondary winding 8 of the main transformer.

Said circuit has been used widely because of its simple construction and highly reliable components. In this circuit, when the product of $V_2 \times T = 2$ ($V_2$: Voltage of secondary winding 8, T: Period) is maintained for a certain period of time, the saturation reactor saturates, and the current commutates from the first FET 5 to the second FET 6 as known already. The secondary voltage $V_2$ of the main transformer 1 is controlled by the magnetic amplifiers 9 and 10 to obtain a constant output voltage $V_o$.

Figure 11:
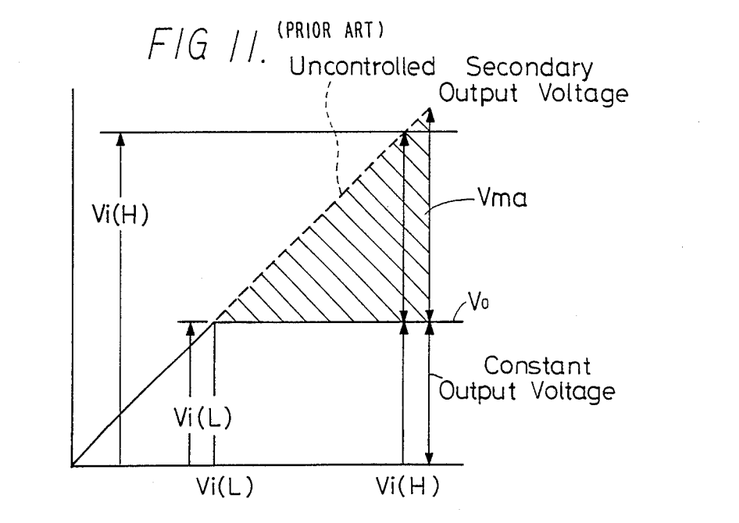
FIGS. 11, 12 and 13 are the operation wave diagrams of the conventional circuits respectively.
Figure 12:
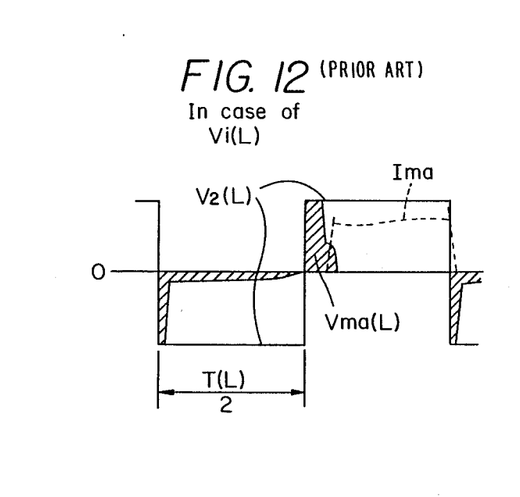
Figure 13:
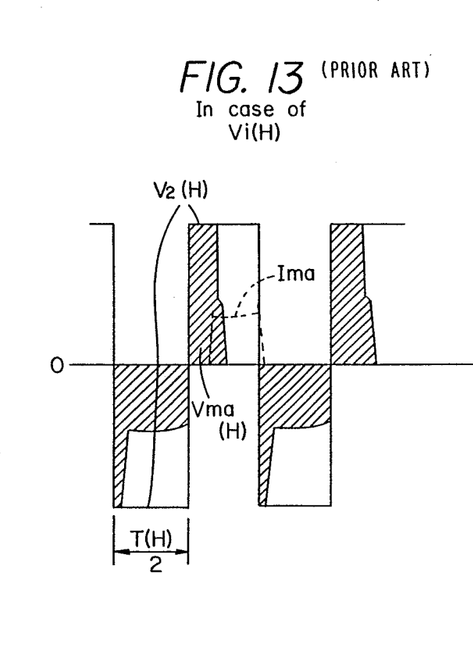

The conventional circuit as is described in the foregoing is disadvantageous in that, as far as the relationship of the input voltage Vi and output voltage Vo shown in FIG. 11 is concerned, the uncontrolled secondary output voltage $V_2$ is in direct proportion to the input voltage Vi as indicated by the dotted line representing its characteristic. On the other hand, however, when the output voltage Vo is controlled by the magnetic amplifiers 9 and 10, said output voltage Vo has the characteristic represented by a solid line shown in FIG. 11 and becomes constant from a certain point on. The product Vma (represented by slant lines) obtained by multiplying the difference of these characteristics $V_2$ and $V_o$ by the voltage and time becomes a load on the operation of the magnetic amplifiers 9 and 10. FIGS. 12 and 13 respectively represent Vi(L), the case where the input voltage is low, and Vi(H), the case where the input voltage is high, corresponding to the cases shown in FIG. 11, wherein the areas covered with slant lines respectively represent the products of the voltage and time Vma(L) and Vma(H). As is clear from FIGS. 12 and 13, when the input voltage is Vi(H), the case of a high input voltage (see FIG. 13), Vma(H), the product the voltage and time, will increase to cause the loss by the heat, the fall of efficiency and the resulting inability to follow a wide range of variation of input voltage Vi.

BRIEF SUMMARY OF THE INVENTION

An object of the present invention is to provide a control circuit capable of effectively controlling the preliminary output or the final output in response to the voltage varying in a wide range.

Another object of the present invention is to provide a highly efficient, simple and highly reliable control circuit capable of controlling the flyback voltage at the time of turning off the first switching element and also capable of permitting a wide range in the input voltage.

The present invention intended for accomplishing the aforesaid objects is characterized by a self-excited inverter circuit comprising a main circuit, two switching elements (the first and second FETs) and a saturation transformer as the main elements, wherein the voltage from the winding of said main transformer is supplied to said saturation transformer through an impedance element so as to provide the voltage or the current necessary to operate said two FETs; the saturation of said saturation transformer causes the two FETs to commutate the current; a rectifier and a capacitor constituting a serial connection circuit is connected to both ends of said first FET; the point where said rectifier and said capacitor are connected is connected to an end of an auxiliary winding having the same number of windings as that of the primary winding of said main transformer, and the other end is connected to the power source through said second FET; said saturation transformer is provided with two output windings which are respectively connected to said first and second FETs so that said FETs operate reversely to each other; and the input winding of said situation transformer is connected to the auxiliary winding of said main transformer through the rectifier, impedance element and a barrier layer voltage element.

In a circuit of the above composition, the capacitor is charged when the first FET is turned off, and the voltage $V_{c1}$ across the first FET is clamped with this charging voltage $V_{c1}$.

The voltage $V_{gs}$ is applied between the gate and the source of the second FET for effecting the continuity therefore. That is, the voltage is clamped by effecting the continuity of the second FET so that $V_{q1}$ or $V_{c1}$ becomes constant eventually, and this state is maintained from the time $T_2$ to the time $T_3$.

Between times $T_2$ and $T_3$ the saturation reactor receives the product of the voltage and time through a quadratic winding. When $T_3$ is reached, the saturation reactor saturates to cause $V_{gs}$ of the first FET, which has been negative, to change towards 0 and then to change to a positive value for turning on the first FET due to the residual inductance of the quadratic winding and the saturation reactor. At the time $T_3$, $V_q$ drops towards Vi and further continues to change towards 0 after passing Vi due to the residual inductive energy of the primary winding of the main transformer and $Iq_1$. In this manner, the voltage $V_{q2}$ varies towards zero to cause the voltage $V_{gs}$ between the gate and the source of the second FET to become zero, and the second FET is shut off. As described in the foregoing, keeping said voltage $V_{q2}$ constant enables to obtain a high $-Vsc(L)$ in the case of Vi(L) and a low $-Vsc(H)$ in the case of Vi(H), and the continuity angle, or duty cycle $(T_1-T_2)/(T_1-T)$ of the first FET is naturally controlled in a desirable direction almost without causing any change in the period of $(T_1-T_3)$.

DETAILED DESCRIPTION

The embodiments of the present invention will be explained in details hereunder in reference to the drawings. The same numerals are used where they are common to those used in FIG. 10.

Figure 1:
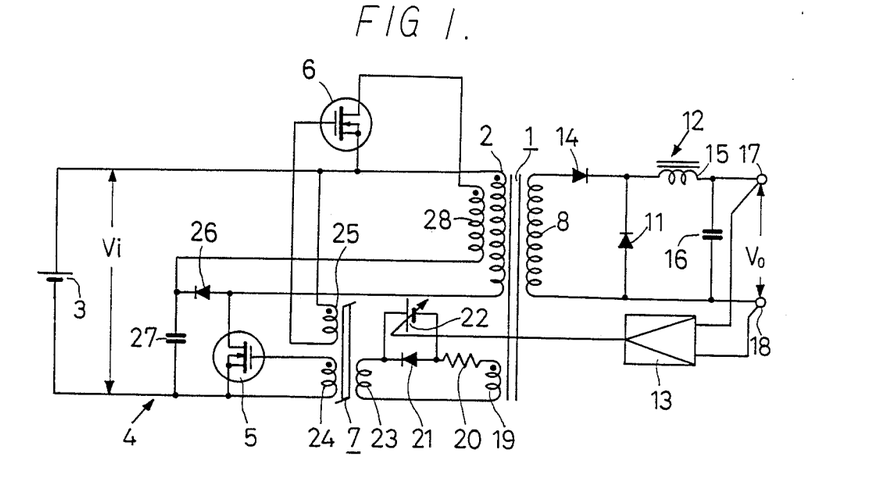
FIG. 1 is an electric circuit diagram of a first embodiment of a continuity angle controlled self-excited inverter according to the present invention.

In FIG. 1, 1 denotes a main transformer, and a DC power source 3 and MOSFETs 5 and 6 as the first and second switching elements are connected to the primary winding 2 of said main transformer 1. Output terminals 17 and 18 are connected to the secondary winding 8 through a rectification and smoothing circuit 12 comprising a rectifier 14, a commutator 11, inductor 15 and a capacitor 16. The quadratic winding 19 of said main transformer 1 is connected to the primary winding 23 of the saturation transformer 7 through an impedance element 20, a rectifier 21 and a barrier layer voltage element 22. The two secondary windings 24 and 25 of said saturation transformer 7 are connected between the gate and source of each of said FETs 5 and 6 so that these FETs operate reversely to each other. A serial circuit of a rectifier 26 and a capacitor 27 is connected between the drain and the source of said first FET 5. The connecting point of the rectifier 26 and the capacitor 27 is connected to an end of the tertiary winding 28 having the same number of turns as that of said primary winding 2, while the other end of said tertiary winding 28 is connected to said DC power source 3 through the drain and source of the second FET 6, Said output terminals 17 and 18 are connected to an error detection amplifier circuit 13, and the output of said error detection amplifier circuit is connected to said barrier layer voltage element 22.

Figure 2:
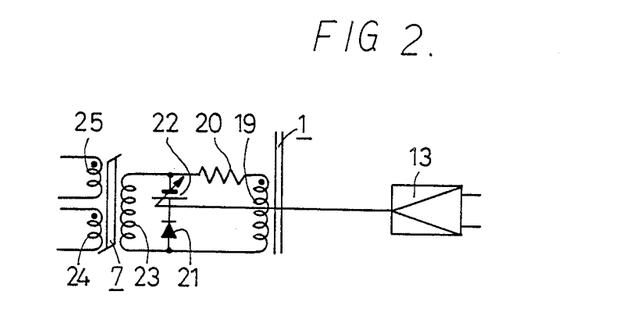
FIG. 2 is an electric circuit diagram of a second embodiment of the present invention.

Regardless of the case where said rectifier 21 and the barrier layer voltage element 22 are connected as shown in FIG. 1, they may be connected in parallel to the primary winding 23 of the saturation transformer 7 as shown in FIG. 2.

Figure 3:
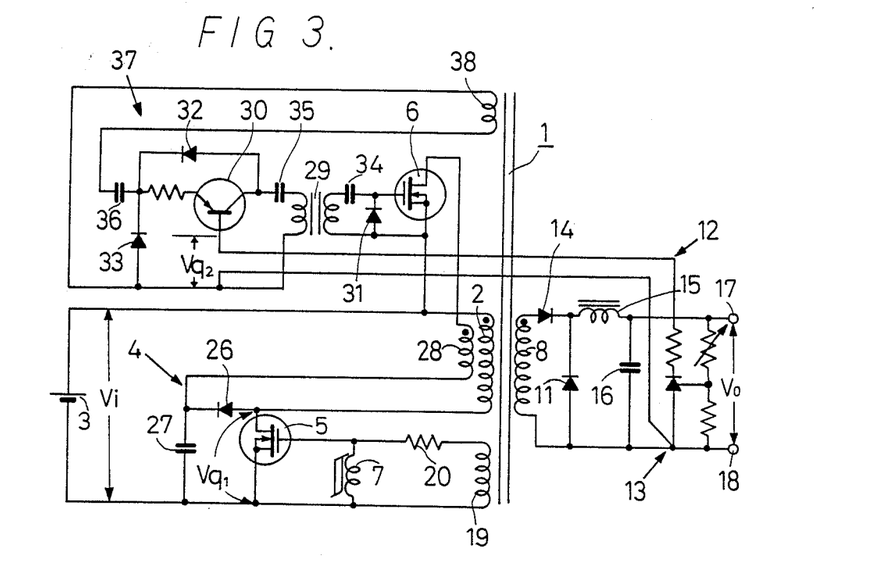
FIG. 3 is an electric circuit diagram of a third embodiment of the present invention.

FIG. 3 shows a case where a saturation reactor 7 is used instead of the saturation transformer. More particularly, the quadratic winding 19 of the main transformer 1, an impedance element 20 and the saturation reactor 7' are connected between the gate and source of the first FET 5; a quintic winding 38 of the main transformer 1 is connected between the gate and source of the second FET 6 through a control circuit 37 comprising an isolator 29, a transistor 30, diodes 31, 32 and 33 and capacitors 34, 35 and 36; and the error detection amplifier circuit 13 is connected to the base of said transistor 30.

The operation of the circuit having the above-described composition will be explained hereunder.

Figure 5:
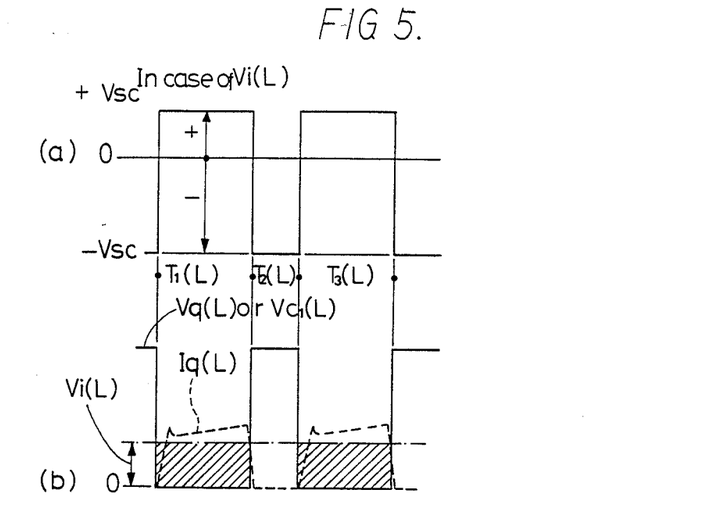
FIGS. 5, 6, 7, 8 and 9 are the operation wave diagrams of the circuit according to the present invention respectively.
Figure 6:
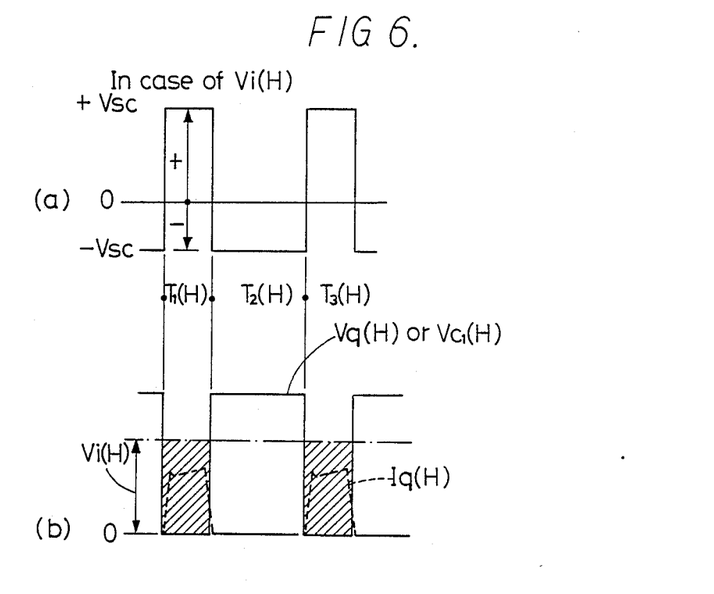

For the basic operation characteristic diagrams, one concerning Vi(L), a case where the input voltage is relatively low, is shown in FIG. 5, and one concerning Vi(H), a case where the input voltage is relatively high, is shown in FIG. 6. The saturation reactor 7' or the saturation transformer 7 is saturated by the product of the voltage and time or $Vi \times (T_1 - T_2)$ represented by the areas covered with slant lines in FIGS. 5 and 6 to cause the first FET 5 to be shut off whereas the continuity of the second FET 6 is effected to commutate the current.

For the convenience of the further explanation, the following explanation will be made in reference to the circuit shown in FIG. 4.

When the first FET 5 is turned off, the capacitor 27 is charged with the inductive energy stored in the main transformer 1 through the rectifier 26, and said charging voltage $Vc_1$ causes the voltage $Vq_1$ across the first FET 5 to be clamped.

Then, the capacitor 36 on the side of the second FET 6 is charged both positively and negatively by the quintic winding 38 through the diode 33 as illustrated in the drawing. After the first FET 5 is turned off, the voltage $Vq_2$ across the diode 33 is combined with the flyback voltage of the quintic winding 38, and the voltage $Vq_2$ eventually becomes proportional to $Vq_1$. The transitor 30 and a Zener diode 39 are connected as illustrated in the drawing, and when $Vq_2 \geq Vz$) (Zener voltage), the voltage Vgs to effect the continuity between the gate and the source of the second FET 6 is supplied to effect the continuity of the second FET 6. That is, the voltage is clamped to maintain $Vq_1$ or $Vc_1$ constant finally by effecting the continuity of the second FET 6, and this state continues from $T_2$ to $T_3$.

During $T_2 - T_3$, the saturation reactor 7' receives the product of the voltage and the time through the quadratic winding 19. This state is as illustrated in FIGS. 5 and 6. When T3 is reached, and the state is represented by $$|-Vsc \, x(T_2-T_3)| = |+Vsc \, x(T_1-T_2)| \tag{1},$$

the saturation reactor 7' will naturally be saturated, and Vgs of the first FET 5, which has been negative, will vary toward O, whereby the voltage varies further toward the positive value or towards turning to off the first FET 5 due to the residual inductance of the quadratic winding 19 and the saturation reactor 7'.

In FIGS. 5 and 6, the voltages Vi and Vq represent the applied voltages to the main transformer 1, but, simultaneously when $$(Vq - Vi) \, x \, (T_2 - T_3) = Vi \, x(T_1 - T_2) \tag{2},$$

Vq drops towards Vi at $T_3$ and further varies toward zero point passing Vi due to the residual inductive energy of the primary winding 2 and $Iq_1$.

In this manner, the voltage $Vq_2$ across said diode 33 varies towards the zero, and the voltage Vgs across the gate and the source of the second FET 6 becomes zero to shut off the second FET 6.

The changes represented by the above two expressions take place simultaneously to cause the shut-off of the second FET 6 and effecting the continuity of the first FET 5 or the commutation of the current.

Figure 7:
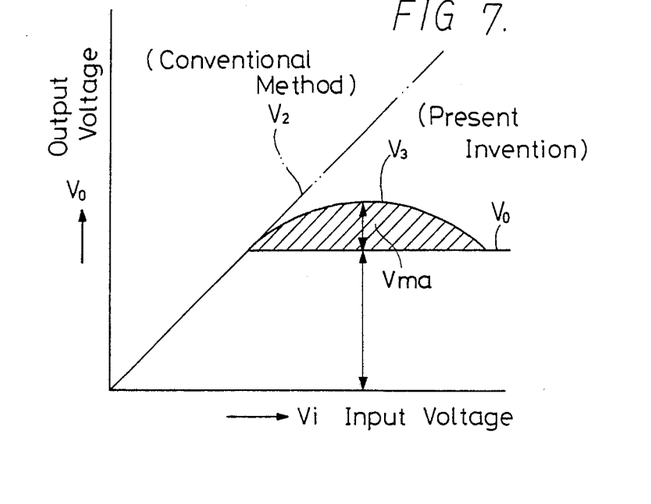
Figure 8:
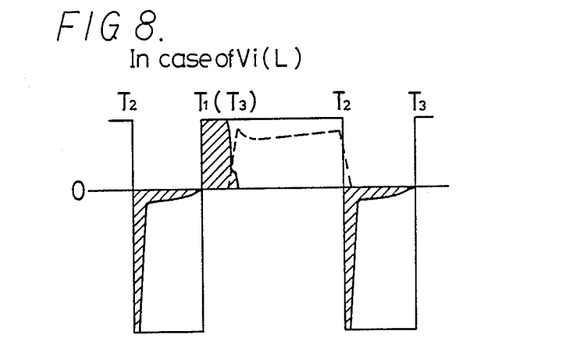
Figure 9:
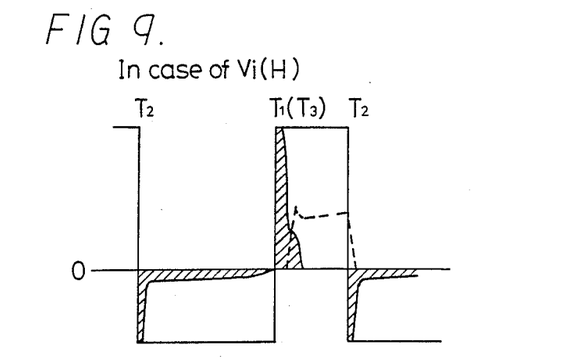

As described in the above, a high−Vsc(L) can be obtained in the case of Vi(L), and a low−Vsc(H) in the case of Vi(H), whereby the continuity angle, or duty cycle $(T_1 - T_2)/(T_1 - T_3)$ of the first FET 5 is naturally controlled in a desirable direction almost without causing any change in the period of $(T_1 - T_3)$. As is clear from the diagrams of FIGS. 7, 8 and 9, the characteristic of $V_3$ according to the present invention is controlled in a better direction than the characteristic $V_2$ of the conventional method. In FIGS. 8 and 9, the areas covered with the slant lines represent the Vma, the product of the voltage and the time to be borne by the magnetic amplifiers 9 and 10, but the burden to be borne in this case is reduced markedly compared with the case shown in FIG. 13. For instance, the inductive energy of the primary winding 2 of the main transformer 1 and other inductive energies stored in the capacitor 27 when the first FET 5 is turned off are returned to the power source through the tertiary winding 28 when the second FET 6 is turned on, so that there will be no power loss theoretically.

Figure 4:
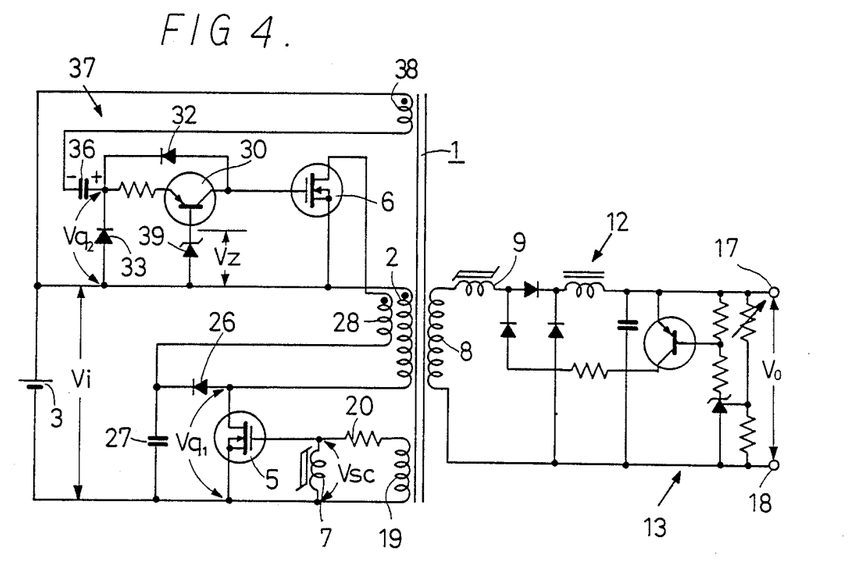
FIG. 4 is an electric circuit diagram to explain the operation of a circuit shown in FIG. 3.

In the above case, a satisfactory result is obtained by maintaining the Zener voltage Vz constant as shown in FIG. 4. In the case shown in FIG. 3, however, the voltage $V_3$ can be controlled to a constant level without using the magnetic amplifier where the said voltage $V_{q3}$ is fed back from the power source output Vo for controlling.

In the case shown in FIG. 1, Vo and $V_3$ can be controlled by directly controlling the voltage applied across $T_2-T_3$ of the saturation transformer 7.

What is claimed is:

1. A continuity angle controlled self-excited inverter circuit comprising a main transformer, two switching elements, namely first and second switching elements, and a saturation transformer as the main components, wherein the voltage or current necessary for operating said two switching elements is supplied by supplying a voltage to said saturation transformer from a winding of said main transformer through an impedance element; said two switching elements perform a commutating operation respectively by saturating said saturation transformer; a series circuit comprising a rectifier and a capacitor is connected to both ends of said first switching element; the connecting point of said rectifier and said capacitor is connected to one end of an auxiliary winding with a number of turns substantially equal to a number of turns of a primary winding of said main transformer and the other end connected to a power source through said second switching element; two output windings provided to said saturation transformer are connected respectively to said first and second switching elements so that said switching elements operate reversely to each other; an input winding of said saturation transformer is connected to the auxiliary winding said main transformer through the rectifier, the impedance element and a barrier layer voltage element.

2. A continuity angle controlled self-excited inverter circuit defined in claim 1, wherein a circuit comprising a parallel circuit of the rectifier and the barrier layer voltage element whereto said impedance element is connected in series is inserted between the input winding of the saturation transformer and the auxiliary winding of the main transformer.

3. A continuity angle controlled self-excited inverter circuit defined in claim 1, wherein said impedance element is inserted between the input winding of the saturation transformer and the auxiliary winding of the main transformer, and a series circuit comprising the rectifier and the barrier layer voltage element is connected in parallel to said input winding.

4. A continuity angle controlled self-excited inverter circuit defined in claim 1, wherein said barrier layer voltage element is connected so that its voltage or impedance can be controlled by the output of an amplification circuit for detecting the output voltage of the power source.

5. A continuity angle controlled self-excited inverter circuit comprising a main transformer, two switching elements, namely first and second switching elements, and a saturation reactor as the main components, wherein the voltage or the current necessary to operate said two switching elements is supplied by supplying a voltage to said saturation reactor from a winding of said main transformer through an impedance element so that the two switching elements perform a commutating operation respectively when said saturation reactor is saturated; a series circuit comprising a rectifier and a capacitor is connected to both ends of said first switching element; the connecting point of said rectifier and the capacitor is connected to one end of an auxiliary winding with a number of turns substantially equal to a number of turns of a primary winding of said main transformer, and the other end connected to a power source through said second switching element; the auxiliary winding of the main transformer is connected between the gate and the source of a MOSFET as said first switching element through the impedance element and also connected in parallel to said saturation reactor; both ends of another auxiliary winding of said main transformer are connected between the gage and the source of a MOSFET as said second switching element through a control circuit.

6. A continuity angle controlled self-excited inverter circuit defined in claim 5, wherein the second switching element is controlled by a detected and amplified output of the power source through an insulation device.

* * * * *

UNITED STATES PATENT AND TRADEMARK OFFICE
CERTIFICATE OF CORRECTION

PATENT NO. : 4,901,214
DATED : February 13, 1990
INVENTOR(S) : Rihei HIRAMATSU et al.

It is certified that error appears in the above-identified patent and that said Letters Patent is hereby corrected as shown below:

On the title page:

After "[73] Assignee: Yutaka Electric Mfg. Co., Ltd." insert --Densetsu Co., Ltd.
     Nemic Lambda Co., Ltd.--

Under [75] Inventors, after "Jun Maruyama, Inaga," insert --Shinzo Takeishi, Kanagawa-ken; Kazushi
     Watanabe, Niigata-ken--.

Signed and Sealed this

Twenty-fifth Day of June, 1991

Attest:

HARRY F. MANBECK, JR.

*Attesting Officer*   *Commissioner of Patents and Trademarks*